United States Patent [19]

Kinoshita et al.

[11] Patent Number: 4,525,725

[45] Date of Patent: Jun. 25, 1985

[54] METHOD AND APPARATUS FOR FORMING MAGNETIC LATENT IMAGES

[75] Inventors: Kunio Kinoshita, Hachioji; Norio Kokaji, Hino, both of Japan

[73] Assignee: Iwatsu Electric Co., Ltd., Tokyo, Japan

[21] Appl. No.: 449,511

[22] Filed: Dec. 13, 1982

[51] Int. Cl.³ .............................................. G01D 15/12
[52] U.S. Cl. .................................... 346/74.5; 358/301
[58] Field of Search ...................... 346/74.2, 74.5, 155, 346/139 C; 358/301

[56] References Cited

U.S. PATENT DOCUMENTS 4,072,957 2/1978 Kokaji et al. ...................... 346/74.2
4,251,822 2/1981 Hara et al. ...................... 346/139 C Primary Examiner—E. A. Goldberg
Assistant Examiner—Fred L. Kampe
Attorney, Agent, or Firm—Paul & Paul

[57] ABSTRACT

A method and apparatus for forming latent images in which all channel heads are used in different line density scanning. In the case of a multi-channel head having at least three channels which are positioned with a constant distance, the order of the arrangement of loci of the respective channels is made to correspond to two normal and reverse sets of line densities, so that recording at two different line densities can be made by one multi-channel head.

2 Claims, 14 Drawing Figures

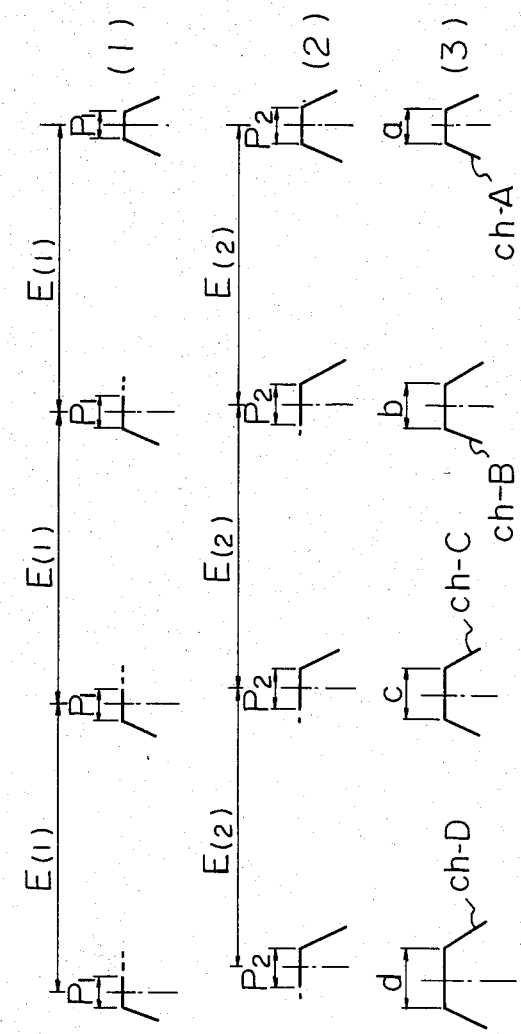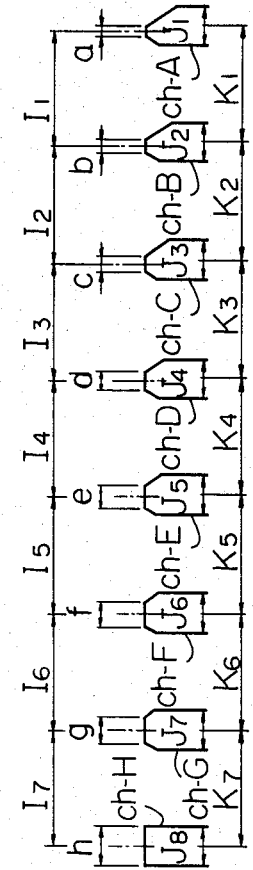
Fig. 12
Fig. 13

METHOD AND APPARATUS FOR FORMING MAGNETIC LATENT IMAGES

BACKGROUND OF THE INVENTION

The present invention relates to a method and apparatus for forming latent images in a magnetic printing apparatus, more particularly, to a method and apparatus for forming latent images at a high efficiency when a multichannel head is used to change the scanning line density.

DESCRIPTION OF THE PRIOR ART

It is often desirable to change the scanning line density in one magnetic printing apparatus. For example, recording is ordinarily carried out at a scanning line density of 10 lines/mm. To obtain a finer and more precise print, however, it may be desirable to record at a scanning density of 13 lines/mm. Alternatively, it may be desirable to use the magnetic printing apparatus as a facsimile apparatus in which a scanning line density of 4 or 8 lines/mm can be selected, or that the magnetic printing apparatus will be used as a multi-task apparatus in which a scanning density of 10 lines/mm is adopted when the apparatus acts as a printer and a scanning line density of 13 lines/mm is adopted when the apparatus acts as a copying machine. In these cases, from the viewpoint of the operation efficiency, it is not preferable to use recording heads in a number corresponding to the number of kinds of the required scanning line densities. The applicant has already proposed a recording system or multichannel head for eliminating this disadvantage in Japanese Examined Publication (KOKOKU) No. 54-32340 or U.S. patent application Ser. No. 637,346, filed Aug. 6, 1984 as a File Wrapper Continuation (FWC) of application Ser. No. 370,128, filed Apr. 20, 1982. However, in the system disclosed in U.S. patent application Ser. No. 637,346, only two channels of, for example, a multichannel head having three channels are used according to the line density, and therefore, the system is not efficient.

SUMMARY OF THE INVENTION

An object of the present invention is to provide method and apparatus for forming latent images which eliminates the drawbacks in the conventional methods and apparatus for forming latent images.

Another object of the present invention is to provide method and apparatus for forming latent images in a magnetic printing apparatus, in which in case of a multi-channel head having at least three channels, the order of the arrangement of loci of the respective channels is made to correspond to two normal and reverse sets of line densities, whereby recording at two different line densities can be made by one multichannel head.

The above-mentioned objects can be achieved by a method for forming latent images in a magnetic printing apparatus, which comprises scanning a magnetic recording medium by a recording head having first, second, ... and m-th channels (m is an integer of $m \geq 3$), wherein at the first magnetic latent image recording scanning, the first, second, ... and m-th channels of the recording head form magnetic latent images on the $(mn-m+1)$-th line (n is a positive integer indicating the scanning frequency of the recording head), the $(mn-m+2)$-th line, ... and the $(mn)$-th line, respectively, and loci of the subsequent channels are overlapped on parts of loci of the preceding channels; at the second magnetic latent image recording scanning, the first, second, ... and m-th channels of the recording head form magnetic latent images on the $(mn)$-th line, the $(mn-1)$-th line, ... and $(mn-m+1)$-th line, respectively, loci of the subsequent channels are overlapped on parts of loci of the preceding channels; and the track pitches of the first, second, ... and m-th channels of the recording head satisfy the requirement of the following formula (1):

$$E_1 = (am+1) \times P_1 \quad (1)$$

wherein $E_1$ stands for the track pitch, a is an optional integer, m stands for the number of channels and $P_1$ stands for the first latent image scanning line width, at the first magnetic latent image recording scanning and also satisfy the requirement of the following formula (2):

$$E_2 = (am-1) \times P_2 \quad (2)$$

wherein $E_2$ stands for the track pitch, which is nearly equal to the track pitch $E_1$, and $P_2$ stands for the second latent image scanning line width, at the second magnetic latent image recording scanning.

The above-mentioned object can also be achieved by providing an apparatus for forming latent images in a magnetic printing apparatus, which comprises a recording head having first, second, ... and m-th channels (m is an integer of $m \geq 3$) and satisfying the requirement of the following formula (1) at the first magnetic latent image recording scanning and the requirement of the following formula (2) at the second magnetic latent image recording scanning:

$$E_1 = (am+1) \times P_1 \quad (1)$$

and $$E_2 = (am-1) \times P_2 \quad (2)$$

wherein both $E_1$ and $E_2$ stand for the track pitch and $E_2$ is nearly equal to $E_1$, a is an optional integer, m stands for the number of channels, $P_1$ stands for the first latent image scanning line width and $P_2$ stands for the second latent image scanning line width, a data store device for storing recording data to be supplied to the respective channels of the recording head, a scanning line density setting device for setting first and second scanning densities for said first and second magnetic latent image recording scannings, a recording control device for supplying, among the recording data stored in said data store device, recording data of the $(mn-m+1)$-th line, the $(mn-m+2)$-th line, ... and the $(mn)$-th line to the first, second, ... and m-th channels, respectively, for the first scanning line density set by the scanning line density setting device and supplying, among the recording data stored in said data store device, recording data of the $(mn)$-th line, the $(mn-1)$-th line, ... and the $(mn-m+1)$-th line to the first, second, ... and m-th channels, respectively, for the second scanning line density set by the scanning line density setting device, and a scanning control device for scanning the recording head on a magnetic recording medium so that loci of the subsequent channels of the recording head are overlapped on parts of the preceding channels of the recording head.

Further features and advantages of the present invention will be apparent from the ensuing description with reference to the accompanying drawings to which, however, the scope of the invention is in no way limited.

BRIEF DESCRIPTION OF THE DRAWINGS

FIG. 12 is a diagram showing the arrangement of four channels in the top end portion of the recording head; and FIG. 13 is a diagram showing the arrangement of eight channels in the top end portion of the recording head.

DETAILED DESCRIPTION OF THE INVENTION

Figure 1:
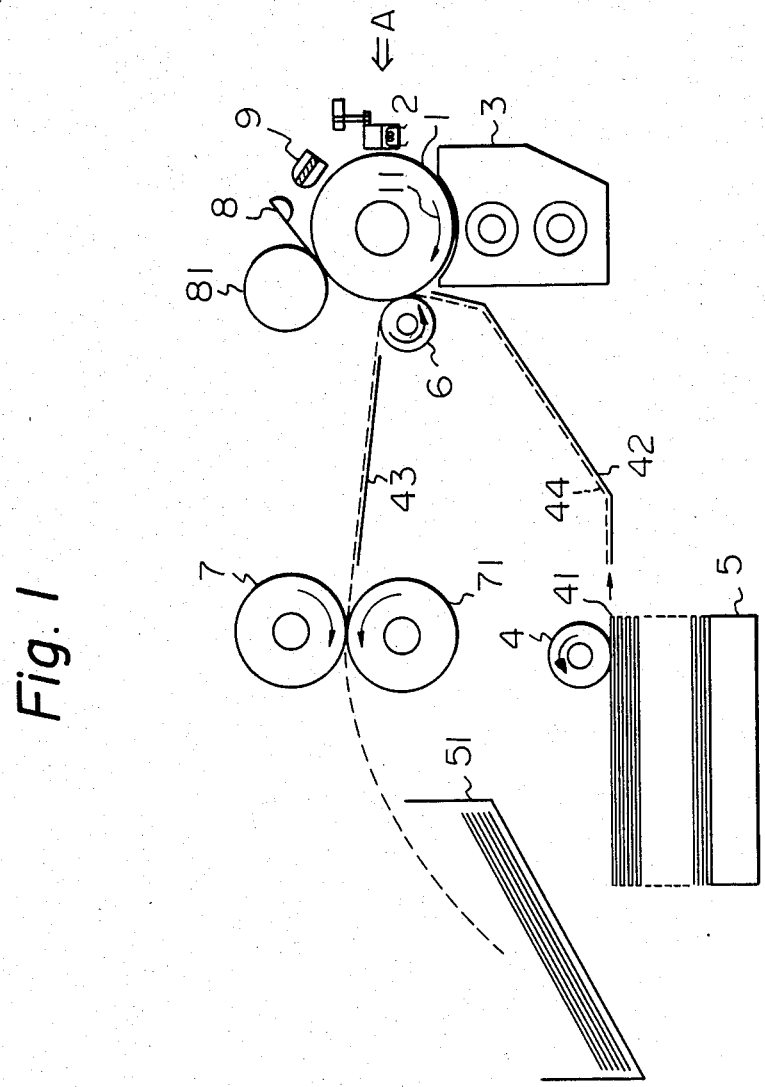
FIG. 1 is a diagram illustrating a magnetic printing apparatus provided with the system of the present invention.
Figure 2:
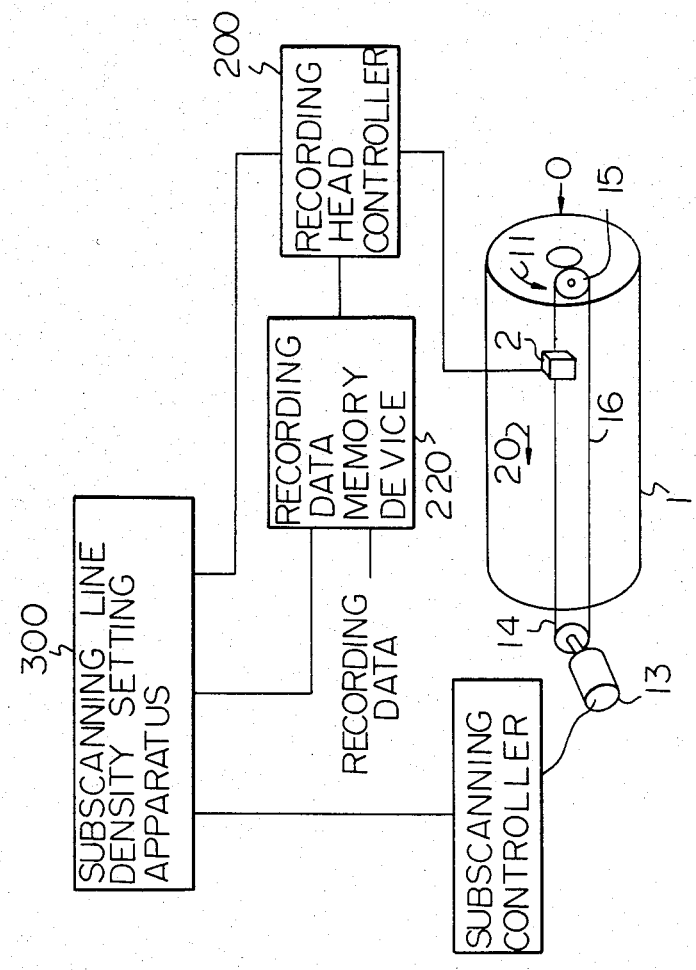
FIG. 2 is a view of the apparatus of FIG. 1 seen in the direction of the arrow.

FIGS. 1 and 2 are diagrams illustrating the magnetic printing apparatus according to the present invention, and FIG. 2 is a view of the apparatus of FIG. 1 seen in the direction indicated by arrow A. Referring to FIG. 1, a recording drum 1 has on the surface thereof a magnetic recording medium such as CO-Ni-P and is rotated in the direction indicated by an arrow 11, and a magnetic latent image is formed on the recording drum 1 by a recording head 2. Formation of the latent image is accomplished by performing scanning with the rotation direction of the recording drum 1 as the main scanning direction and the axial direction of the recording drum 1 as the subsidiary scanning direction. As shown in FIG. 2, the recording head 2 forms a latent image while it is being moved in the direction indicated by an arrow 20 by a subsidiary scanning mechanism comprising a subsidiary scanning motor 13 (for example, a pulse motor), pulleys 14 and 15, and a wire 16. When formation of a latent image of one page is completed, a magnetic toner is supplied to the recording drum 1 from a developing machine 3 and the magnetic latent image is converted to a visible image. A paper 41 is supplied from a paper stacker 5 by a paper feed roller 4 and is delivered through a course shown by a broken line 44 along a paper feed guide 42. The visible magnetic toner image is transferred onto the paper 41 by a transfer roller 6. Then, the paper 41 is fed to fixing rollers 7 and 71 along a paper feed guide 43, the toner image is fixed by heat or pressure, and the paper 41 is then discharged to a stacker 51.

Figure 3:
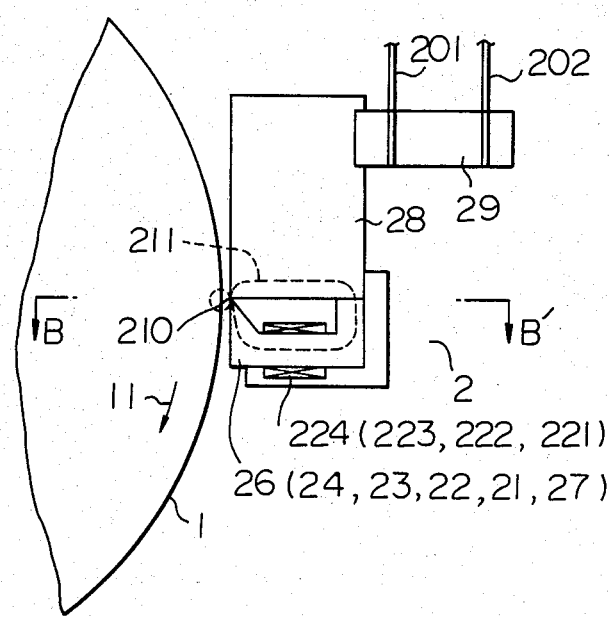
FIG. 3 is an enlarged view showing a recording drum and a recording head in FIG. 1 and FIG. 2.
Figure 4:
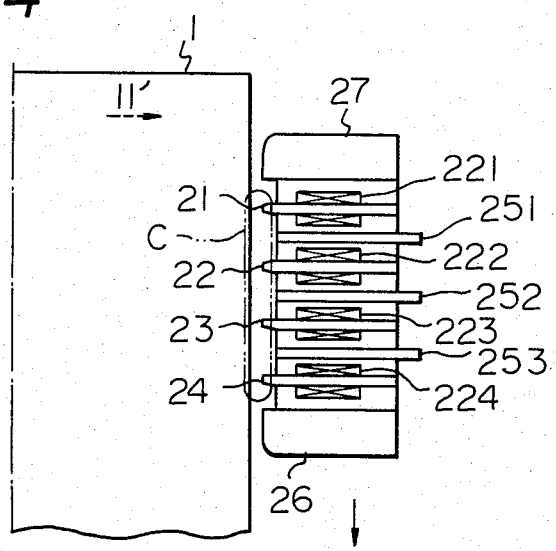
FIG. 4 is a view of recording drum and recording head of FIG. 3 seen along the section B—B'.

FIG. 3 is an enlarged view of the portion of the recording head 2 of the recording drum 1 shown in FIG. 1, and FIG. 4 is a view showing the section taken along the line B—B' in FIG. 3. For simplification of the explanation, a 4-channel head is illustrated as the recording head 2. Coils 221, 222, 223, and 224 are wound on a core 21 of channel A (hereinafter referred to as "ch-A"), a core 22 of channel B (hereinafter referred to as "ch-B"), a core 23 of channel C (hereinafter referred to as "ch-C") and a core 24 of channel D (hereinafter referred to as "ch-D"), respectively, and shield plates 251, 252, and 253 are arranged between the cores 21 and 22, between the cores 22 and 23, and between the cores 23 and 24, respectively. In FIG. 3, reference numeral 210 represents a butting gap, and broken line 211 indicates a magnetic force line. A slider is constructed by members 26, 27, and 28, and the recording head 2 is dynamically raised with high-speed rotation of the recording head 1. The recording head 2 is supported on the subsidiary scanning mechanism (the wire 16 and the like) through a core support 29 and plate springs 201 and 202.

Figure 5:
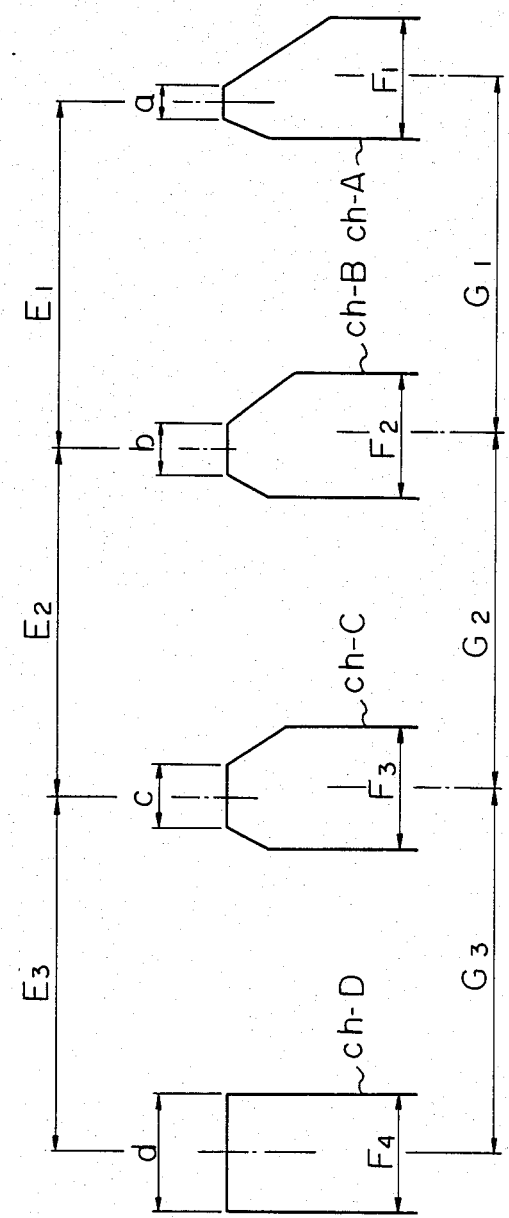
FIG. 5 is a view showing the top end portion of the recording head.

FIG. 5 is an enlarged view of the top end portion (the portion surrounded by a two-dot chain line C in FIG. 4) of the recording head 2. It must be noted that the track widths a, b, c, and d of ch-A, ch-B, ch-C, and ch-D are different from one another and the relation of $d<c<b<a$ is established, though the reason is described hereinafter. For example, a is 0.08 mm, b is 0.11 mm, c is 0.13 mm and d is 0.3 mm, while each of $E_1$, $E_2$, and $E_3$ is 0.71 mm, each of core thicknesses $F_1$, $F_2$, $F_3$, and $F_4$ is 0.3 mm and each of core center gaps $G_1$, $G_2$, and $G_3$ is 0.7 mm.

Figure 6A:
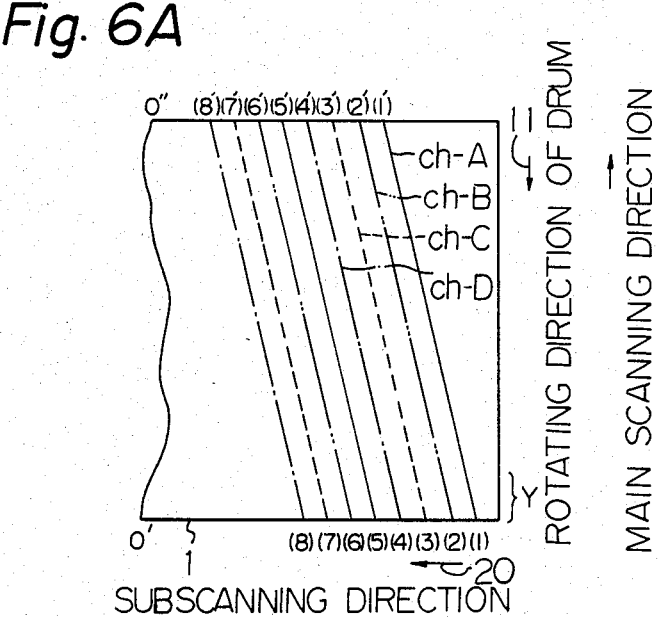
FIGS. 6A and 6B are development views of the recording drum shown in FIG. 2.
Figure 6B:
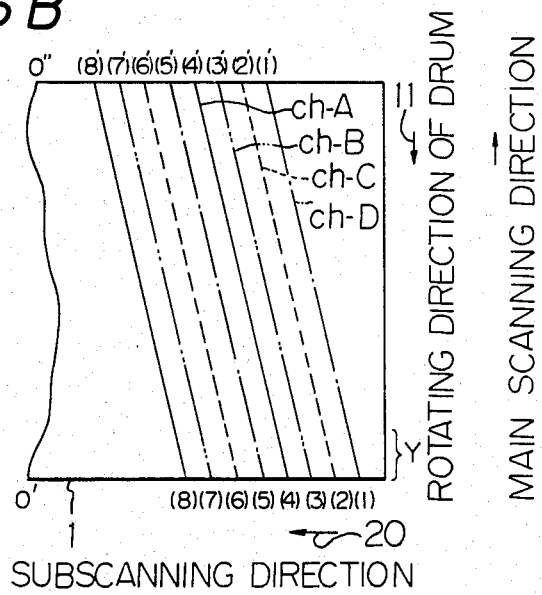

FIGS. 6A and 6B show loci of the tracks on the recording drum 1, which are formed when a latent image is formed by using this four-channel head. FIGS. 6A and 6B are development views of the recording drum 1, obtained by cutting the recording drum 1 at the position of 0 in FIG. 2 and developing the recording drum 1. Accordingly, the lower end 0' (starting end of main scanning) and upper end 0'' (terminal end of main scanning) on the recording drum 1 in FIGS. 6A and 6B are at the same position as the point 0 of the recording drum 1 in FIG. 2. As indicated by a solid line in FIG. 6A, the main scanning locus of the first line of ch-A begins at (1) on 0' and ends at (1') on 0''. The point (1') on 0'' is the same as the point (5) on 0'. Then, the main scanning of the fifth line is carried out from the point (5) on 0' to the point (5') on 0''. Thus, ch-A takes charge of formation of a latent image on lines 1, 5, 9, . . . and (4n-3) (n is an integer of at least 1). Similarly, ch-B draws loci (2)→(2') on the second line, (2')=(6), (6)→(6'), . . . . as indicated by a two-dot chain line and takes charge of formation of a latent image on lines 2, 6, 10, . . . and (4n-2), and ch-C draws loci (3)→(3') on the third line, (3')=(7), (7)→(7'), . . . , as indicated by a broken line and takes charge of formation of a latent image on lines 3, 7, 11, . . . and (4n-1). Similarly, ch-D draws loci (4)→(4') on the fourth line, (4')=(8), (8)→(8'), . . . , as indicated by a one-dotted chain line and takes charge of formation of a latent image on lines 4, 8, 12, . . . and 4n. Thus, the first magnetic latent image recording scanning is formed, as shown in Table 1.

TABLE 1

|       | 1      | 2      | 3       | 4       | n           |
|-------|--------|--------|---------|---------|-------------|
| ch-A  | line 1 | line 5 | line 9  | line 13 | line (4n-3) |
| ch-B  | line 2 | line 6 | line 10 | line 14 | line (4n-2) |
| ch-C  | line 3 | line 7 | line 11 | line 15 | line (4n-1) |
| ch-D  | line 4 | line 8 | line 12 | line 16 | line 4n     |

Formation of a latent image at a different line density by using ch-A, ch-B, ch-C, and ch-D of the same recording head 2 will now be described with reference to FIG. 6B.

In FIG. 6B, the loci of ch-A, ch-B, ch-C, and ch-D shown in FIG. 6A are replaced by loci of ch-D, ch-C, ch-B, and ch-A, respectively. More specifically, loci (1)→(1') and (5)→(5') in FIG. 6A are those of ch-D in FIG. 6B, loci (2)→(2') and (6)→(6') are those of ch-C, loci (3)→(3') and (7)→(7') are those of ch-B, and loci (4)→(4') and (8)→(8') are those of ch-A. Thus, the second magnetic latent image scanning is formed. Lines recorded by ch-A, ch-B, ch-C, and ch-D are shown in Table 2.

TABLE 2

|       | 1      | 2      | 3       | 4       | n           |
|-------|--------|--------|---------|---------|-------------|
| ch-A  | line 4 | line 8 | line 12 | line 16 | line 4n     |
| ch-B  | line 3 | line 7 | line 11 | line 15 | line (4n-1) |
| ch-C  | line 2 | line 6 | line 10 | line 14 | line (4n-2) |
| ch-D  | line 1 | line 5 | line 9  | line 13 | line (4n-3) |

When Table 1 is compared with Table 2, it is seen that the lines of ch-A in Table 1 are the same as those of ch-D in Table 2, the lines of ch-B in Table 1 are the same as those of ch-C in Table 2, the lines of ch-C in Table 1 are the same as those of ch-B in Table 2 and the lines of ch-D in Table 1 are the same as those of ch-A in Table 2.

Figure 7:
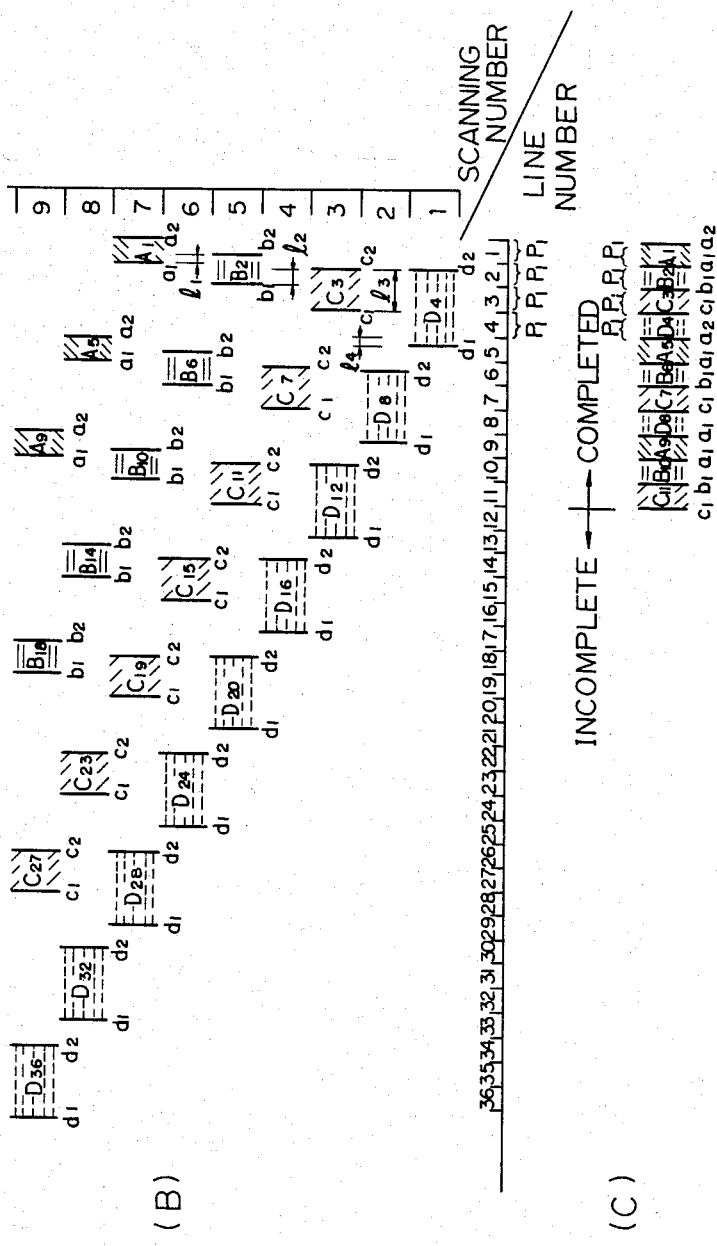
FIG. 7 is a diagram illustrating the formation of a latent image at a first magnetic latent image recording scanning.

FIG. 7 is a diagram illustrating the state where at the first magnetic latent image recording scanning, a latent image is formed by ch-A, ch-B, ch-C, and ch-D described above with reference to FIG. 6A and Table 1. FIG. 7-(A) shows the arrangement of ch-A, ch-B, ch-C, and ch-D, and FIG. 7-(B) shows loci of ch-A, ch-B, ch-C, and ch-D. Each locus is a part of Y in FIG. 6A. In FIG. 7-(B), the line number is plotted on the abscissa and the scanning number is plotted on the ordinate. In an embodiment shown in FIG. 7, the line pitch $P_1$ is, for example, 0.08 mm and is almost equal to the track width a of ch-A. As described hereinafter, the relation of $E_1=E_2=E_3=9P_1$ is established, and ch-A, ch-B, ch-C, and ch-D simultaneously draw lines separated from each other by 9 lines. In FIGS. 7-(A) and 7-(B), ch-A draws line 9, ch-B draws line 18, ch-C draws line 27 and ch-D draws line 36. At the first scanning, ch-D draws line 4 (locus $D_4$), and the width of this locus is d (=0.3 mm). At this point, ch-C, ch-B, and ch-A are not yet located at recording positions, and therefore, the coils 223, 222, and 221 of ch-C, ch-B, and ch-A are not energized. While the recording drum makes one rotation, the recording head 2 is moved by 4P in the direction of arrow 20 [see FIGS. 6A and 6B], and at the second scanning, ch-D draws line 8 (locus $D_8$). Similarly, at the third scanning, ch-D draws line 12 (locus $D_{12}$) and ch-C draws line 3 (locus $C_3$), at the fifth scanning, ch-D draws line 20 (locus $D_{20}$), ch-C draws line 11 (locus $C_{11}$) and ch-B draws line 2 (locus $B_2$), and at the seventh scanning, ch-D draws line 28 (locus $D_{28}$), ch-C draws line 19 (locus $C_{19}$), ch-B draws line 10 (locus $B_{10}$), and ch-A draws line 1 (locus $A_1$). Recording by ch-C is behind recording by ch-D, but the locus of ch-C is overlapped by a part $l_3$ of the locus of ch-D. However, if saturated recording is carried out, this overlap is completely rewritten as the locus of ch-C. Similarly, recording by ch-B is behind recording by ch-C, but the locus of ch-B is overlapped by a part $l_2$ of the locus ch-C. However, if saturated recording is carried out, this overlap is completely rewritten as the locus of ch-B. Similarly, recording by ch-A is behind recording by ch-B, but the locus of ch-A is overlapped by a part $l_4$ or $l_1$ of the locus of ch-D or ch-B. However, if saturated recording is carried out, this overlap is completely rewritten as the locus of ch-A. Although the width of the locus of ch-D is d, the part $l_3$ overlapping the locus of ch-C is rewritten as the locus of ch-C. Accordingly, the width of the locus of ch-D is reduced to $d-l_3$. Although the width of the locus of ch-C is c, the part $l_2$ overlapping the locus of ch-B is rewritten as the locus of ch-B. Accordingly, the width of the locus of ch-C is reduced to $c-l_2$ and the values of c and $l_2$ are determined so that the relation of $c-l_2=P_1$ is established. Although the width of the locus of ch-B is b, the part $l_1$ overlapping the locus of ch-A is rewritten as the locus of ch-A. Accordingly, the width of the locus of ch-B is reduced to $b-l_1$, and the values of b and $l_1$ are determined so that the relation of $b-l_1=P_1$ is established. The locus of ch-A overlaps a part $l_1$ of the locus of ch-B and a part $l_4$ of the locus of ch-D. Accordingly, the width of the locus of ch-D is reduced to $d-l_3-l_4$, and the values of d, $l_3$ and $l_4$ are determined so that the relation of $d-l_3-l_4=P_1$ is established. The width of the locus ch-A is a, which is nearly equal to $P_1$. Accordingly, the width of each of the synthesized loci of ch-A, ch-B, ch-C, and ch-D is $P_1$, as shown in FIG. 7-(C). Incidentally, FIG. 7-(C) shows the state where recording of lines 1 through 11 is completed. Thus, a latent image is formed at a pitch of 0.08 mm, that is, at a subsidiary scanning line density of 12.5 lines/mm.

In order to effect recording simultaneously on lines separated from each other by 9 lines, it is necessary to store recording data during a certain period and pick up the data when the recording head arrives at the recording position.

Figure 8:
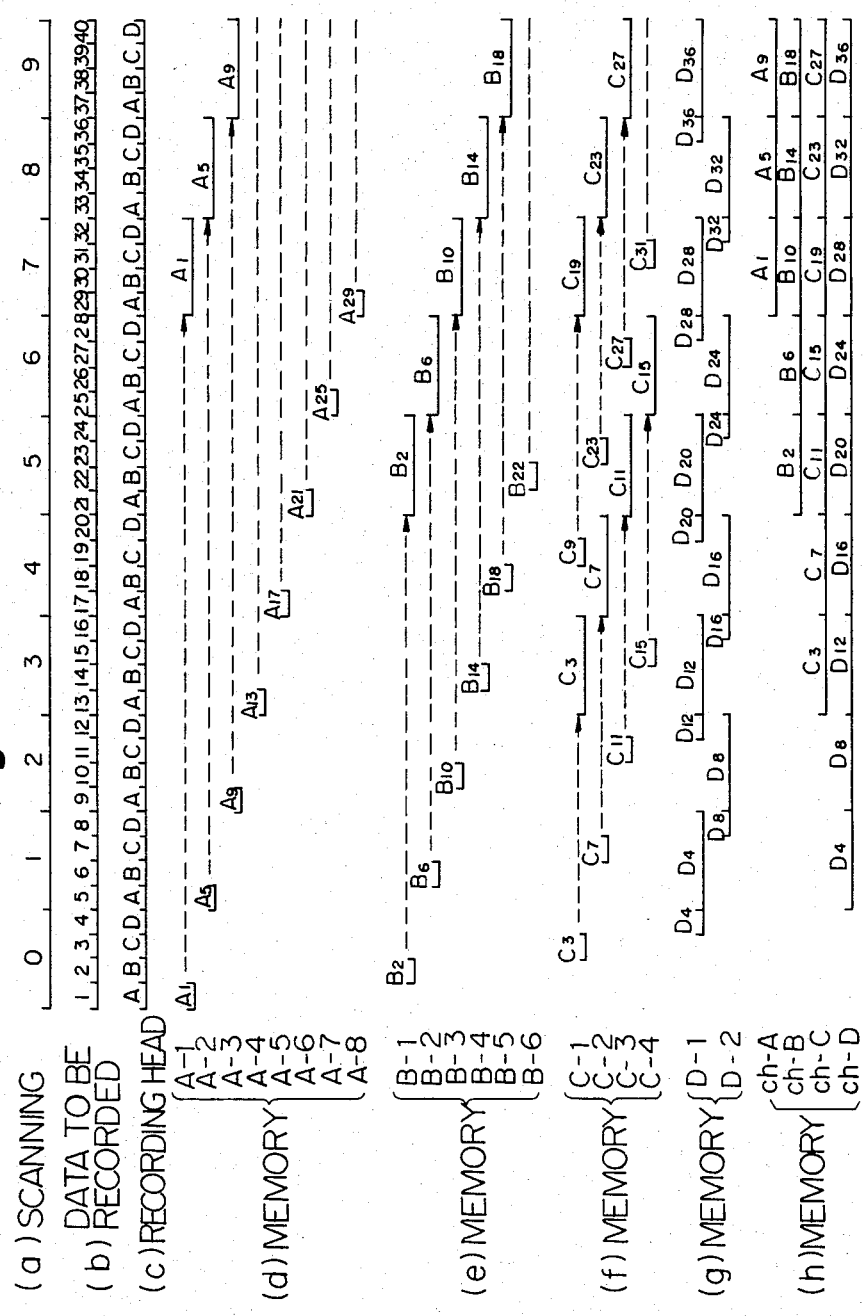
FIG. 8 is a time chart illustrating the formation of a latent image shown in FIG. 7.

The chart of timing for effecting recording in the sequence shown in FIG. 7 is shown in FIG. 8. In FIG. 8, (a) shows scannings 0 through 9 of the recording head 2, and (b) shows data to be recorded, and data of 4 lines are fed during the period of one scanning. FIG. 8-(c) shows recording data to be taken charge of by the two channels of the recording head 2. As shown in FIG. 7-(B), for example, line 1 is recorded at the scanning 7 by ch-A. With reference to the timing chart, as indicated by memory A-1 in FIG. 8-(d), at the scanning 0, the recording data of line 1 is stored in a memory, for example, RAM (random access memory). At the scanning 7, the recording data of line 1 is read out and is recorded on the recording drum 1 by ch-A. The capacity of the memory is, for example, 4 Kbits and is adjusted so that recording data of one line can be stored. Similarly, recording data of line 2 is stored in memory B-1 in FIG. 8-(e), and at the scanning 5, the recording data of line 2 is read out and is recorded on the recording drum 1 by ch-B. Similarly, recording data of line 3 is stored in memory C-1 shown in FIG. 8-(f) and at the scanning 3, the recording data of line 3 is read out and is recorded on the recording drum 1 by ch-C. Similarly, recording data of line 4 is stored in memory D-1 shown in FIG. 8-(g) and at the subsequent scanning 1, the recording data of line 4 is read out and is recorded on the recording drum 1 by ch-D. Similarly, recording data of line 5 and subsequent lines is sequentially stored in memory A, memory B, memory C, and memory D, and at the scanning times shown in FIG. 7-(B), this data is read out and recorded on the drum 1 by the channels ch-A, ch-B, ch-C, and ch-D. As is seen from the timing chart of FIG. 8, a capacity of eight lines is necessary for the memory for ch-A, a capacity of six lines is necessary for the memory for ch-B, a capacity of four lines is necessary for the memory for ch-C, and a capacity of two lines is necessary for the memory for ch-D. A capacity of, for examples, 4 Kbits is arranged for each line. This structure is shown in the block diagram of FIG. 9.

Figure 9:
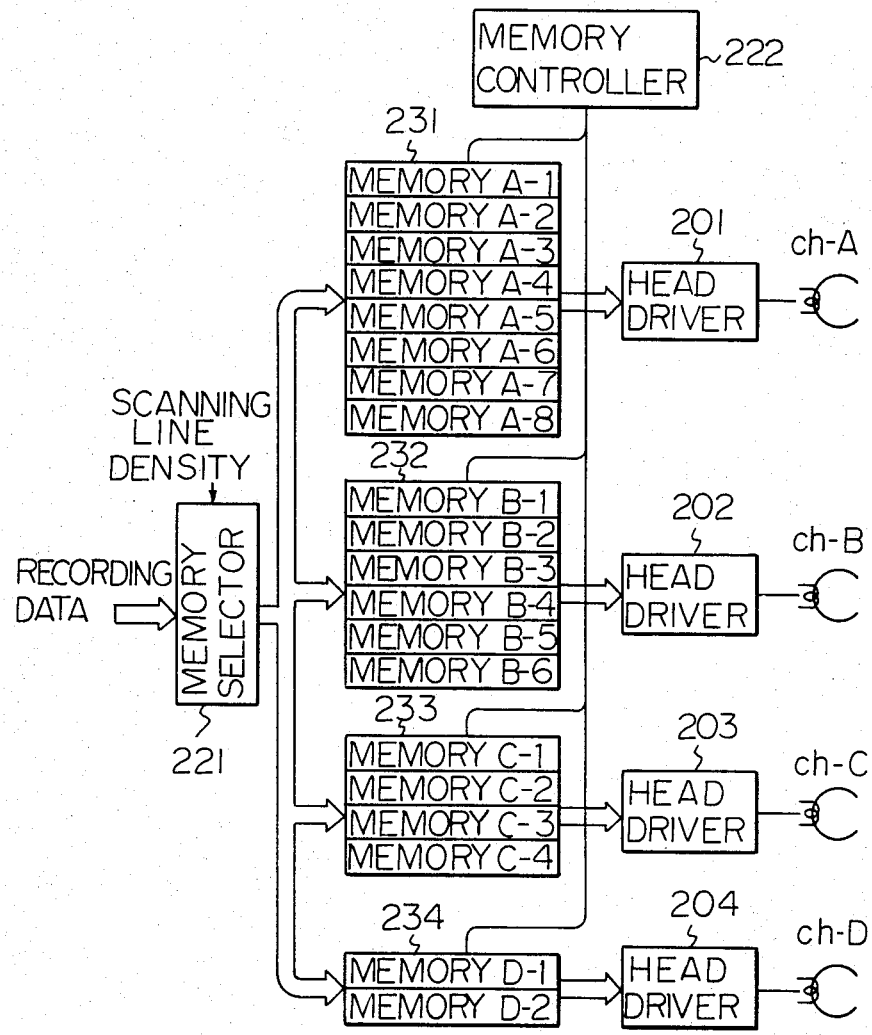
FIG. 9 is a detailed block diagram of a recording head control device for performing the formation of a latent image shown in FIG. 7.

Referring to FIG. 9, recording data is first put in a memory selector 221, and according to the value of the scanning line density, the memory selector determines the memory in which the recording data is to be put. For example, in the case where the scanning line density is 13 lines/mm, as shown in the timing chart of FIG. 8, recording data of line 1 is put in the memory A231, recording data of line 2 is put in the memory B232, recording data of line 3 is put in the memory C233, and recording data of line 4 is put in the memory D234. Then, recording data is put in this sequence into the respective memories. The recording data stored in the respective memories is put out at the timings shown in the timing chart of FIG. 8 and put in the corresponding channels of the recording head through head drivers 201, 202, 203, and 204. The output of the memory A231 is recorded by ch-A, the output of the memory B232 is recorded by ch-B, the output of the memory C233 is recorded by ch-C, and the output of the memory 234 is recorded by ch-D. These memories are controlled by a memory controller 222, and the recording data is stored (written) and read out at necessary timings.

The second magnetic latent image recording scanning for forming a latent image at a different line density by using ch-A, ch-B, ch-C, and ch-D of the same recording head 2, which has been described hereinbefore with reference to FIG. 6B and Table 2, will now be explained in detail with reference to FIG. 10.

Figure 10:
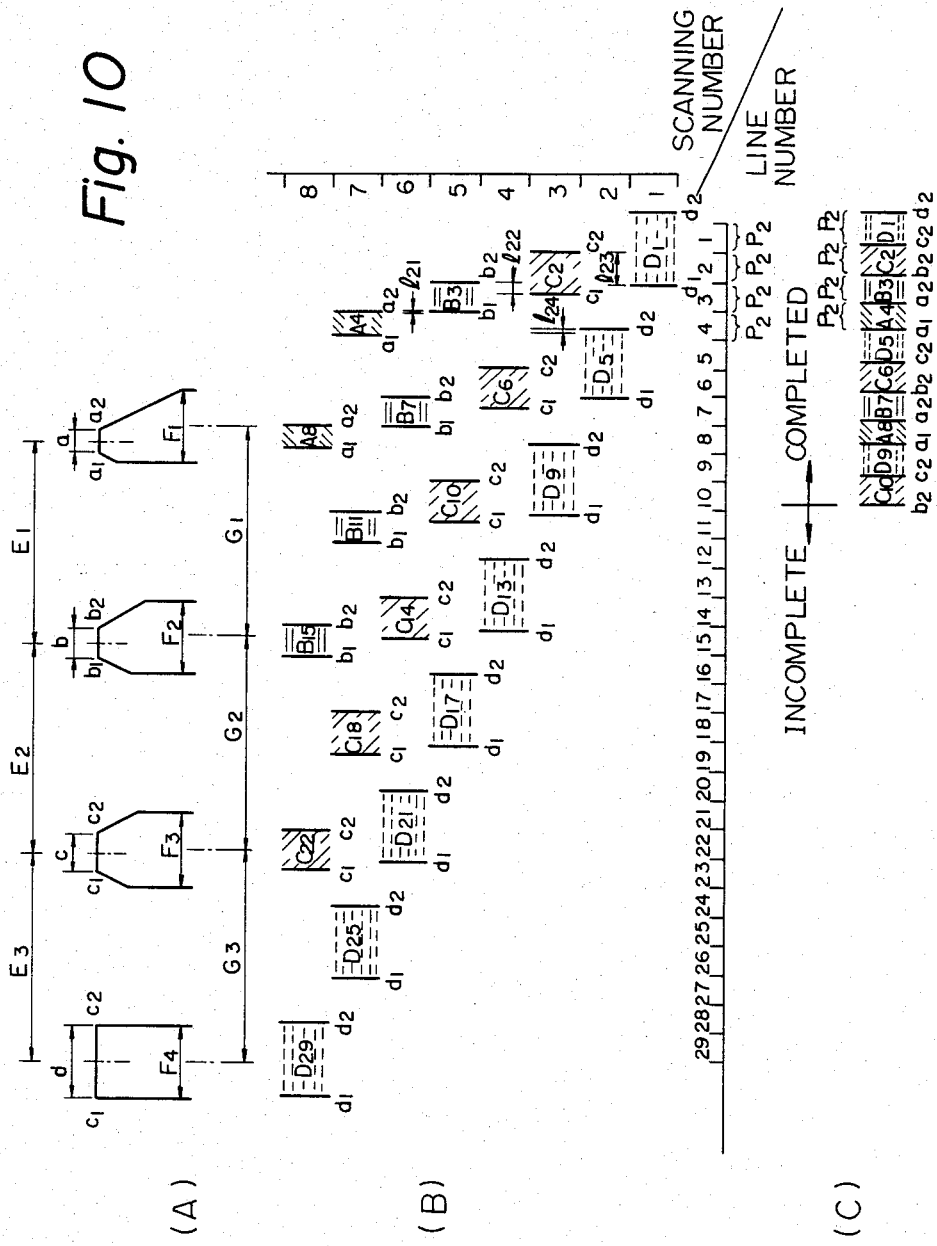
FIG. 10 is a diagram illustrating the formation of a latent image at the second magnetic latent image recording scanning.

The arrangement of ch-A, ch-B, ch-C, and ch-D is illustrated in FIG. 10-(A). This arrangement is the same as shown in FIG. 7-(A), because the same head as used in the embodiment shown in FIG. 7 is used in this embodiment. Loci of ch-A, ch-B, ch-C, and ch-D are shown in FIG. 10-(A), and each locus is a part of Y in FIG. 6B. The line number is plotted on the abscissa and the scanning number is plotted on the ordinate. The line pitch $P_2$ is, for example, 0.1 mm, which is a value close to the track width a of ch-A. Incidentally, as described hereinafter, the relation of $E_1 = E_2 = E_3 = 7P_2$ is established, and ch-A, ch-B, ch-C, and ch-D simultaneously draw lines separated from each other by 7 lines. FIGS. 10-(A) and 10-(B) show the state where ch-A draws line 8, ch-B draws line 15, ch-C draws line 22, and ch-D draws line 29. At the first scanning, ch-D draws line 1 (locus $D_1$). At this point, ch-C, ch-B, and ch-A are not yet located at recording positions, and therefore, the coils 223, 222, and 221 of ch-C, ch-B, and ch-A are not energized. While the recording drum 1 makes one rotation, the recording head 2 is moved by $4P_2$ in the direction of arrow 20, and at the second scanning, ch-D draws line 5 (locus $D_5$). Similarly, at the third scanning, ch-D draws line 9 (locus $D_9$) and ch-C draws line 2 (locus $C_2$), but since ch-B and ch-A are not yet located at recording positions, the coils 222 and 221 of ch-B and ch-A are not energized. Similarly, at the fifth scanning, ch-D draws line 17 (locus $D_{17}$), ch-C draws line 10 (locus $C_{10}$), and ch-B draws line 3 (locus $B_3$), but since ch-A is not yet located at the recording position, the coil 221 of ch-A is not energized. Similarly, at the sixth scanning, ch-D draws line 21 (locus $D_{21}$), ch-C draws line 14 (locus $C_{14}$), and ch-B draws line 7 (locus $B_7$). Since ch-A is located one line on this side of line 1, ch-A records "white" so as to narrow the width of the locus of ch-D to the intended width. Similarly, at the seventh scanning, ch-D draws line 25 (locus $D_{25}$), ch-C draws line 18 (locus $C_{18}$), ch-B draws line 11 (locus $B_{11}$), and ch-A draws line 4 (locus $A_4$).

Although recording by ch-C is behind recording by ch-D, the locus of ch-C overlaps a part $l_{23}$ of the locus of ch-D. However, if saturated recording is carried out, this overlap is completely rewritten as the locus of ch-C. Similarly, although recording by ch-B is behind recording by ch-C, the locus of ch-B overlaps a part $l_{22}$ of the locus of ch-C. However, if saturated recording is carried out, this overlap is completely rewritten as the locus of ch-B. Similarly, although recording by ch-A is behind recording by ch-B, the locus of ch-A overlaps parts $l_{24}$ and $l_{21}$ of the loci of ch-D and ch-B. However, if saturated recording is carried out, the overlap is completely rewritten as the locus of ch-A. Although the width of the locus of ch-D is d, since the part $l_{23}$ overlapping the locus of ch-C is rewritten as the locus of ch-C, the width of the locus of ch-D is reduced to $d - l_{23}$. Although the width of the locus of ch-C is c, since the part $l_2$ overlapping the locus of ch-B is rewritten as the locus of ch-B, the width of the locus of ch-C is reduced to $c - l_{22}$, and the values of c and $l_{22}$ are determined so that the relation of $c - l_{22} = P_2$ is established. Although the width of the locus of ch-B is b, since the part $l_{21}$ overlapping the locus of ch-A is rewritten as the locus of ch-A, the width of the locus of ch-B is reduced to $b - l_{21}$, and the values of b and $l_{21}$ are determined so that the relation of $b - l_{21} = P_2$ is established. The locus of ch-A overlaps the part $l_{21}$ of the locus of ch-B and the part $l_{24}$ of the locus of ch-D. Accordingly, the width of the locus ch-D is reduced to $d - l_{23} - l_{24}$, and the values of d, $l_{23}$ and $l_{24}$ are determined so that the relation of $d - l_{23} - l_{24} = P_2$ is established. The width of the locus of ch-A is a, which is nearly equal to $P_2$. Accordingly, the width of each of the synthesized loci of ch-A, ch-B, ch-C, and ch-D is $P_2$, as shown in FIG. 10-(C). Incidentally, FIG. 10-(C) shows the state where recording of lines 1 through 10 is completed. Thus, a latent image is formed at a pitch of 0.1 mm, that is, at a subsidiary scanning line density of 10 lines/mm.

Actually, the track width of ch-A is selected so that the relation of $a = P_1$, $P_1 < a < P_2$ or $a = P_2$ is established. For example, in case of $P_1 = 0.08$ mm and $P_2 = 0.1$ mm, if a is equal to $P_1$, a is 0.08 mm, and the loci A, B, C, and D shown in FIG. 7-(C) are completed with a pitch $P_1$. However, in the embodiment shown in FIG. 10-(C), the relation of $P_2 - a = 0.02$ mm is established, and the loci A, B, C, and D shown in FIG. 10-(C) are not completed with a pitch $P_2$. Since the width of the locus A is narrower by $P_2 - a$ ($= 0.02$ mm) than the pitch $P_2$, the width of the locus D or B adjacent to the locus A is broader by $P_2 - a$ ($= 0.02$ mm) than the pitch $P_2$. It is possible to broaden both the loci D and B or broaden one of the loci D or B. Accordingly, in FIG. 10-(C), the widths of the loci D, C, B, and A are 0.12 mm, 0.1 mm, 0.1 mm, and 0.08 mm, respectively, or 0.11 mm, 0.1 mm, 0.11 mm, and 0.08 mm, respectively. In each case, the difference of the locus width is small and can practically be neglected. Accordingly, it is sufficient if the track width a of ch-A is made to correspond to the pitch on the side where the scanning line density should be precise. In the case where the scanning line densities on both the sides are equally important, the track width a is adjusted to a value intermediate between $P_1$ and $P_2$, that is, the relation of $P_1 < a < P_2$ is selected. In order to simultaneously record lines separated from each other by 7 lines, it is necessary that recording data be stored during a certain period and these data be taken out when the recording head arrives at the recording position. The timing chart for performing recording in the sequence shown in FIG. 10 is shown in FIG. 11.

Figure 11:
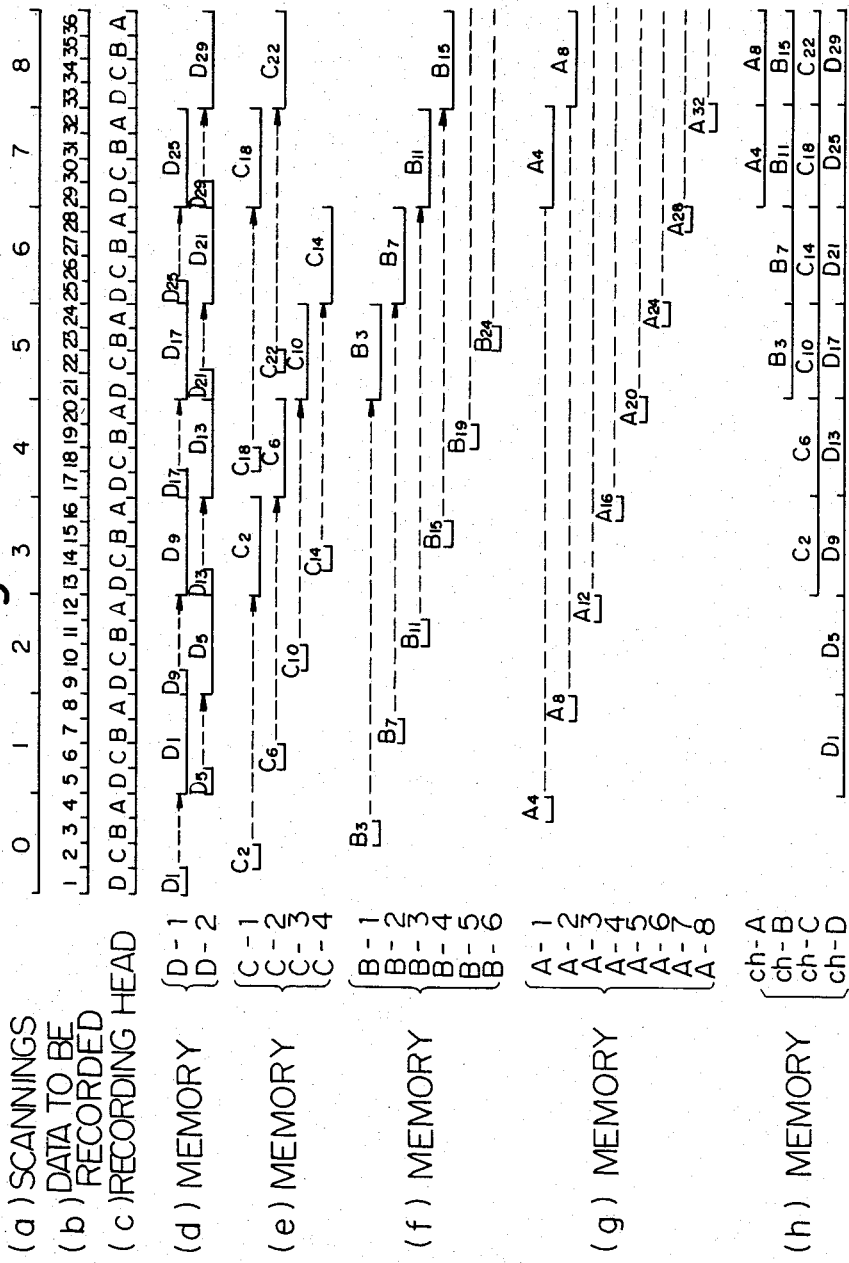
FIG. 11 is a time chart illustrating the formation of a latent image shown in FIG. 10.

In FIG. 11, (a) shows scannings 0 through 8 of the recording head 2, and (b) shows data to be recorded and data of 4 lines are fed during the period of one scanning. FIG. 11-(c) shows the lines, recording data of which are to be recorded by the four channels of the recording head, respectively. For example, line 1 is recorded by ch-D at the scanning 1, as shown in FIG. 10. With reference to the timing chart, as indicated by memory D-1 shown in FIG. 11-(d), at the scanning 0, the recording data of line 1 is stored by a memory, for example, RAM. At the scanning 1, the recording data of line 1 is read out and is recorded on the recording drum 1 by ch-D.

Similarly, the recording data of line 2 is stored in memory C-1 shown in FIG. 11-(e), and at the scanning 3, the recording data of line 2 is read out and is recorded on the recording drum 1 by ch-C. Similarly, the recording data of line 3 is stored by memory B-1 shown in FIG. 11-(f), and at the scanning 5, the recording data of line 3 is read out and is recorded on the recording drum 1 by ch-B. Similarly, the recording data of line 4 is stored in memory A-1 shown in FIG. 11-(g) and at the scanning 7, the recording data of line 4 is read out and is recorded on the recording drum 1 by ch-A. Similarly, the recording data of line 5 and subsequent lines is sequentially stored in memories D, C, B, and A, and at the scannings shown in FIG. 10-(B), this recording data is read out and is recorded on the recording drum 1 by the channels ch-D, ch-C, ch-B, and ch-A. As is seen from the timing chart of FIG. 11, a capacity of two lines is necessary for the memory for ch-D, a capacity of four lines is necessary for the memory for ch-C, a capacity of six lines is necessary for the memory for ch-B, and a capacity of eight lines is necessary for the memory for ch-A. A capacity of, for example, 4 Kbits is arranged for each line. It is seen that the memory structure in this case where the scanning line density is 10 lines/mm is the same as in the case where the scanning line density is 12.5 lines/mm.

Accordingly, the structure shown in the block diagram of FIG. 9 is constructed. In the case where the scanning line density is 10 lines/mm, as is shown in the timing chart of FIG. 11, the memory selector 221 puts the recording data of lines 1, 2, 3, and 4 into the memories D234, C233, B232, and A231, respectively. Then, the recording data is put in the memories D234, C233, B232, and A231 in this sequence. The recording data stored in the respective memories is put out at the timings shown in the timing chart of FIG. 11 and put in the respective channels of the recording head through the head drivers 204, 203, 202, and 201, and it is recorded on the recording drum 1. The respective memories are controlled by the memory controller 222.

In designing the shape of the multichannel head, it is necessary that the track pitch E of each channel satisfy the following requirement:

$$E = (am+1) \times P \quad (1)$$

or $$ti\ E = (am-1) \times P \quad (2)$$

wherein a is an optional integer, m stands for the channel number, and P stands for the latent image scanning line width, that is, the reciprocal number of the scanning line density.

If a is 0 in the formula (1), E is equal to P, and the multichannel head is arranged in correspondence to each recording pitch. However, in the magnetic head, since a wire-wound portion or a shield portion should be formed, construction of the structure of $a=0$ is difficult. The locus of the multichannel head of the track pitch represented by the formula (1) is readily seen as in case of a $=0$. The case where a is 2 and m is 4, that is, E is 9P, is shown in FIG. 7-(C). If the channels are called channels A, B, C, and D with respect to the subsidiary scanning direction as shown in FIG. 7-(A), the loci of the respective channels are arranged in order of A, B, C, and D.

In FIG. 7-(A), the edges of the tracks of the channels A, B, C, and D with respect to the advancing direction of the subsidiary scanning are designated as $a_1$, $b_1$, $c_1$, and $d_1$, and the edges with respect to the opposite direction are designated as $a_2$, $b_2$, $c_2$, and $d_2$. As shown in FIG. 7-(B), both the ends of the loci of the respective channels A, B, C, and D are $a_1a_2$, $b_1b_2$, $\overline{c_1c_2}$, and $d_1d_2$. Actually, however, recording is performed so that the loci of the channels partially overlap each other. More specifically, as shown in FIG. 7-(C), the locus $C_3$ overlaps a part of the locus $D_4$, and therefore, the edge $c_1$ of the track of ch-C is left on the locus. Furthermore, since the locus $B_2$ overlaps a part of the locus $C_3$, the edge $b_1$ of the track of ch-B is left on the locus. The locus $A_1$ overlaps a part of the locus $B_2$, and recording by ch-A is last. Accordingly, all the locus of ch-A is left. Therefore, the edges $a_1$ and $a_2$ of the track of ch-A are left as the locus. Accordingly, in case of recording by the multichannel head at the track pitch represented by the formula (1), among the edges of the tracks of the respective channels, the edge on the side of the advancing direction of the subsidiary scanning of the head, that is, affix 1, is left in the locus, with the result that the recording width of the locus of each track is determined. Therefore, in designing of the multichannel head of the track pitch represented by the formula (1), great importance is attached to the edge on the side of the advancing direction of the subsidiary scanning of the head. For example, in case of a four-channel head, in the formula (1), m is 4, and if a is 2, E is equal to $9P_1$. In this case, if the multichannel head is designed by adjusting $P_1$ to 0.08 mm, the arrangement shown in FIG. 12-(1) is obtained. The track pitch E is 0.72 mm (=0.08×9), and the track width is 0.08 mm on both the sides of the central line. As pointed out hereinbefore, the edge on the side of the advancing direction of the subsidiary scanning is important. Since the edge on the side opposite the advancing direction of the subsidiary scanning is not left as the locus because of the partial overlap, this edge is not important. Accordingly, in FIG. 12-(1), this edge is represented by a dotted line.

In case of the track pitch represented by the formula (2), for example, if a is 2 and m is 4, E is equal to 7P. This case is shown in FIG. 10. As shown in FIG. 10-(C), the loci are arranged in order of D, C, B, and A, that is, the reverse order of the order shown in FIG. 7-(C). As in the embodiment shown in FIG. 7, the edges of the tracks of the channels A, B, C, and D with respect to the advancing direction of the subsidiary scanning are designated as $a_1$, $b_1$, $c_1$, and $d_1$, and the edges with respect to the opposite direction are designated as $a_2$, $b_2$, $c_2$, and $d_2$. As shown in FIG. 10-(A), both the edges of the respective loci A, B, C, and D of ch-A, ch-B, ch-C, and ch-D are $a_1a_2$, $b_1b_2$, $c_1c_2$, and $d_1d_2$. Actually, however, recording is performed so that the loci of the channels partially overlap each other. More specifically, as shown in FIG. 10-(C), the locus $C_6$ overlaps a part of the locus $D_5$, and therefore, the edge $c_2$ of the track of ch-C is left on the locus. Furthermore, since the locus $B_7$ overlaps a part of the locus $C_6$, the edge $b_2$ of the track of ch-B is left on the locus. Moreover, since the locus $A_8$ overlaps a part of the locus $B_7$ and recording by ch-A is last, all the locus of ch-A is left and both the edges $a_1$ and $a_2$ are left as the locus. Accordingly, in case of recording by the multichannel head at the track pitch represented by the formula (2), among the edges of the tracks of the respective channels, the edge on the side opposite to the advancing direction of the subsidiary scanning, that is, affix 2, is left in the locus, with the result that the recording width of the locus of each track is determined. Therefore, in designing of the multichannel head of the track pitch represented by the formula (2), great importance is given to the edge on the side opposite to the advancing direction of the subsidiary scanning of the head. For example, in case of a four-channel head, in the formula (2), m is 4, and if a is 2, E is equal to $7P_2$. In this case, if the multichannel head is designed by adjusting $P_2$ to 0.1 mm, the arrangement shown in FIG. 12-(2) is obtained. The track pitch E is 0.7 mm ($=0.1$ mm $\times 7$), and the track width is 0.1 mm on both the sides of the central line. As pointed out hereinbefore, the edge on the side opposite the advancing direction of the subsidiary scanning is important. Since the edge on the side of the advancing direction of the subsidiary scanning is not left as the locus because of partial overlap, this edge is not important. Accordingly, in FIG. 12-(2), this edge is represented by a dotted line.

A multichannel head satisfying both the requirements represented by the formulae (1) and (2) is designed.

At first, values almost equal to the formulae (1) and (2) are selected as track pitches.

Next, the track pitch E(1) according to the formula (1) and the track pitch E(2) according to the formula (2) are selected so that the relation of $E(1) > E(2)$ is established. According to the value of the channel number m or the optional integer a, the value of $E(1) - E(2)$ is selected within a range of from about 0.01 mm to about 0.2 mm. In FIG. 12, this value is 0.02 mm.

In the third place, from the track pitch E(1) determined by the formula (1) and the recording width $P_1$, for example, as shown in FIG. 12-(1), the edge on one side of the multi-channel head is determined. Then, from the track pitch E(2) determined by the formula (2) and the recording width $P_2$, for example, as shown in FIG. 12-(2), the edge on the opposite side of the multichannel head is determined. Thus, the edges on both the sides of the multichannel head are determined. This state is shown in FIG. 12-(3). The track width of the most preceding channel of the multichannel head, for example, ch-D in the embodiment shown in FIG. 7-(A), is preferably broader than the value shown in FIG. 12-(3), because the subsequent channel overlaps a part of this channel on both sides of the locus as shown in FIG. 7-(C) or 10-(C). Accordingly, as is seen from FIG. 12, in the embodiment shown in FIG. 12-(3), the value of the track width a of ch-A is determined so that the relation of $P_1 \leq a \leq P_2$ is established. The track width b of ch-B is expressed as $$b = \frac{P_1}{2} + \frac{P_2}{2} + (E(1) - E(2)),$$

and in the embodiment shown in FIG. 12-(3), the track width b is $$0.11 \text{ mm} \left[ = \frac{0.08}{2} + \frac{0.1}{2} + (0.72 - 0.7) \right].$$

The track width c is expressed as $$c = \frac{P_1}{2} + \frac{P_2}{2} + 2(E(1) - E(2)),$$

and in the embodiment shown in FIG. 12-(3), c is 0.13 mm. Similarly, the track width d of ch-D is expressed as $$d = \frac{P_1}{2} + \frac{P_2}{2} + 3(E(1) - E(2)),$$

and d is equal to 0.15 mm. It is sufficient if the track width is larger than this value, and in the present embodiment, d is 0.3 mm.

Change or control of the subsidiary scanning width P is accomplished by controlling the subsidiary scanning motor 13 (for example, a pulse motor) by the subsidiary scanning control circuit 210 (see FIG. 2). Supposing that the quantity of movement by one pulse by the pulse motor is set at 0.04 mm, if $P_1$ is 0.08 mm, the movement quantity is $4P_1$ ($=0.32$ mm) per rotation of the recording drum 1, that is, per scanning, and the applied pulse number is 8 ($=0.32/0.04$). If $P_2$ is 0.1 mm, the movement quantity is $4P_2$ ($=0.4$ mm), and the applied pulse number is 10 ($=0.4/0.04$).

The operation of performing recording at different line densities by using a four-channel head has been described. Many modifications can be made to this embodiment. If a multichannel head having at least three channels is used, loci of the respective channels can be arranged in two manners. Namely, the arrangement of A, B, C, A, B, C, ... and the reverse arrangement of C, B, A, C, B, A, ... are possible. If two different line densities are made to correspond to the above two arrangements, two kinds of subsidiary scanning line densities can be used.

Another embodiment is shown in FIG. 13. An eight-channel head is used in the embodiment shown in FIG. 13. There are eight channels ch-A, ch-B, ch-C, ch-D, ch-E, ch-F, ch-G, and ch-H having track widths a, b, c, d, e, f, g, and h, respectively, and the relation of $a < b < c < d < e < f < g < h$ is established among these track widths. If it is desired to form latent images at two scanning line densities of 10 lines/mm and 13 lines/mm, the track widths a, b, c, d, e, f, g, and h are set at 0.09 mm, 0.11 mm, 0.13 mm, 0.15 mm, 0.17 mm, 0.19 mm, 0.21 mm, and 0.3 mm, respectively, each of the track pitches $I_1$ through $I_7$ is adjusted to 0.69 mm, each of the core thicknesses $J_1$ through $J_8$ is adjusted to 0.3 mm, and each of the core pitches $K_1$ through $K_7$ is controlled to 0.7 mm. When the scanning line density of 13 lines/mm is adopted, the respective channels ch-A through ch-H simultaneously record lines separated from each other by 9 lines, and the head is moved by the distance of 8 lines, that is, 0.6 mm (=0.075 mm×8), per rotation of the recording drum 1. The loci of the respective channels are arranged in order of locus A, locus B, locus C, locus D, locus E, locus F, locus G, and locus H. The lines which are taken charge of by the respective channels are shown in Table 3.

TABLE 3

|      | 1      | 2       | 3       | 4       | n           |
|------|--------|---------|---------|---------|-------------|
| ch-A | line 1 | line 9  | line 17 | line 25 | line (8n-7) |
| ch-B | line 2 | line 10 | line 18 | line 26 | line (8n-6) |
| ch-C | line 3 | line 11 | line 19 | line 27 | line (8n-5) |
| ch-D | line 4 | line 12 | line 20 | line 28 | line (8n-4) |
| ch-E | line 5 | line 13 | line 21 | line 29 | line (8n-3) |
| ch-F | line 6 | line 14 | line 22 | line 30 | line (8n-2) |
| ch-G | line 7 | line 15 | line 23 | line 31 | line (8n-1) |
| ch-H | line 8 | line 16 | line 24 | line 32 | line 8n     |

When the scanning line density of 10 line/mm is adopted, the respective channels ch-A through ch-H simultaneously record lines separating by 9 lines from each other, and the head is moved by the distance of 8 lines, that is, 0.8 mm (=0.1 mm×8), per rotation of the recording drum 1. The loci of the respective channels are arranged in order of locus H, locus G, locus F, locus E, locus D, locus C, locus B, and locus A. The lines which are taken charge of by the respective channels are shown in Table 4.

TABLE 4

|      | 1      | 2       | 3       | 4       | n           |
|------|--------|---------|---------|---------|-------------|
| ch-A | line 8 | line 16 | line 24 | line 32 | line 8n     |
| ch-B | line 7 | line 15 | line 23 | line 31 | line (8n-1) |
| ch-C | line 6 | line 14 | line 22 | line 30 | line (8n-2) |
| ch-D | line 5 | line 13 | line 21 | line 29 | line (8n-3) |
| ch-E | line 4 | line 12 | line 20 | line 28 | line (8n-4) |
| ch-F | line 3 | line 11 | line 19 | line 27 | line (8n-5) |
| ch-G | line 2 | line 10 | line 18 | line 26 | line (8n-6) |
| ch-H | line 1 | line 9  | line 17 | line 25 | line (8n-7) |

When feed of subsidiary scannings is performed by the pulse motor, if the feed quantity is set at 0.1 mm per pulse, in case of the scanning line density of 13 lines/mm, the movement distance is 0.6 mm per rotation of the recording drum, and therefore, six pulses (=0.6/0.1) are applied for one rotation of the recording drum 1. In case of the scanning line density of 10 lines/mm, the movement distance is 0.8 mm per rotation of the recording drum 1, and therefore, eight pulses (=0.8/0.1) are applied for one rotation of the recording drum 1.

A subsidiary scanning density setting device 300 (see FIG. 2) discriminates the mode set by an operation panel (not shown) or the mode set by an exterior device (such as a printer control device or facsimile control device) and gives an instruction of the line density to be adopted to a recording head control device 200 and a subsidiary scanning control device 210. According to this instruction, the recording head control device 200 selects the order of the loci. A recording data memory device 220 is a memory device for putting the recording data into the respective channels according to the recording order. Furthermore, according to the abovementioned instructions of the line density, the subsidiary scanning control device 210 selects the number of pulses to be applied to the pulse motor 13.

The foregoing embodiments are illustrative of the present invention and by no means limit the scope of the present invention. For example, the principle of the present invention can be applied to a thin film multichannel head and also to the case where vertical magnetization is effected.

As is apparent from the foregoing description, according to the present invention, recording can be performed at two different subsidiary scanning line densities by using one head having at least three channels, and all the channels can be used. Therefore, the system of the present invention is highly efficient.

The term "track pitch" as used in the specification and in the claims means the distance between centers of adjacent head cores. For example, the track pitch in FIG. 7 is $E_1$, $E_2$, $E_3$.

The term "scanning line width" as used in the specification and in the claims means the line width recorded by overlapping. For example, the scanning line width in FIG. 7 is $P_1$ and in FIG. 10 is $P_2$.

The optional integer "a" is a value corresponding to the number of revolutions of the drum made until the loci of the subsequent channel stands side by side with the preceding channel among the width of adjacent channels. Actually, the value of "a" is selected by an integer as small as possible. This is because the head is small in size and the image memory is minimized. However, this value is restricted in the frame work of the head, so that the most suitable value is selected. For example, in a 4 channel head, the value of "a" is selected as 2 or 3, and in an 8 channel head, the value of "a" is selected as 1 or 2.

We claim:

1. A method for forming latent images in a magnetic printing apparatus, which comprises scanning a magnetic recording medium by a recording head having first, second, . . . and m-th channels (m is an integer of m≧3), wherein at a first magnetic latent image recording scanning, first, second, . . . and m-th channels of the recording head form magnetic latent images on the (mn−m+1)-th line (n is a positive integer indicating the scanning frequency of the recording head), the (mn−m+2)-th line, . . . and the (mn)-th line, respectively, and loci of the subsequent channels are overlapped on parts of loci of the preceding channels; at a second magnetic latent image recording scanning, first, second, . . . and m-th channels of the recording head form magnetic latent images on the (mn)-th line, the (mn−1)-th line, . . . and (mn−m+1)-th line, respectively, loci of the subsequent channels are overlapped on parts of loci of the preceding channels; and the track pitches of the first, second, . . . and m-th channels of the recording head satisfy the requirement of the following formula (1):

$$E_1 = (am+1) \times P_1 \qquad (1)$$

wherein $E_1$ stands for the track-pitch, a is an optional integer, m stands for the number of channels and $P_1$ stands for a first latent image scanning line width, at the first magnetic latent image recording scanning and also satisfy the requirement of the following formula (2):

$$E_2 = (am-1) \times P_2 \quad (2)$$

wherein $E_2$ stands for the track pitch, which is nearly equal to the track pitch $E_1$, and $P_2$ stands for a second latent image scanning line width, at the second magnetic latent image recording scanning.

2. An apparatus for forming latent images in a magnetic printing apparatus, which comprises a recording head having first, second, ... and m-th channels (m is an integer of $m \geq 3$) and satisfying the requirement of the following formula (1) at a first magnetic latent image recording scanning and the requirement of the following formula (2) at a second magnetic latent image recording scanning:

$$E_1 = (am+1) \times P_1 \quad (1)$$

and $$E_2 = (am-1) \times P_2 \quad (2)$$

wherein both $E_1$ and $E_2$ stand for the track pitch and $E_2$ is nearly equal to $E_1$, a is an optional integer, m stands for the number of channels, $P_1$ stands for a first latent image scanning line width and $P_2$ stands for a second latent image scanning line width, a data store device for storing recording data to be supplied to the respective channels of the recording head, a scanning line density setting device for setting first and second scanning densities for said first and second magnetic latent image recording scannings, a recording control device for supplying, among the recording data stored in said data store device, recording data of the $(mn-m+1)$-th line, the $(mn-m+2)$-th line, ... and the $(mn)$-th line to the first, second, ... and m-th channels, respectively, for the first scanning line density set by the scanning line density setting device and supplying, among the recording data stored in said data store device, recording data of the $(mn)$-th line, the $(mn-1)$-th line, ... and the $(mn-m+1)$-th line to the first, second, ... and m-th channels, respectively, for the second scanning line density set by the scanning line density setting device, and a scanning control device for scanning the recording head on a magnetic recording medium so that loci of the subsequent channels of the recording head are overlapped on parts of the preceding channels of the recording head.

* * * * *